United States Patent [19]

Sjöholm et al.

[11] Patent Number: 5,524,717
[45] Date of Patent: Jun. 11, 1996

[54] METHOD OF USING A PRESSURIZED MEDIUM IN DRILLING

[76] Inventors: Harri Sjöholm, Suoramantie 44, FIN-36220 Kangasala; Risto Wisakanto, Ilmarinkatu 33, FIN-33500 Tampere, both of Finland

[21] Appl. No.: 313,193
[22] PCT Filed: Apr. 21, 1993
[86] PCT No.: PCT/FI93/00165
   § 371 Date: Nov. 22, 1994
   § 102(e) Date: Nov. 22, 1994
[87] PCT Pub. No.: WO93/21418
   PCT Pub. Date: Oct. 28, 1993

[30] Foreign Application Priority Data

Apr. 22, 1992 [FI] Finland ................. 921777

[51] Int. Cl.⁶ .................................. E21B 21/00
[52] U.S. Cl. ........................... 175/65; 507/103
[58] Field of Search ................... 166/275, 283; 175/65, 70; 507/103, 116

[56] References Cited

U.S. PATENT DOCUMENTS

| | | |
|---|---|---|
| 2,246,802 | 6/1941 | Kehm et al. . |
| 3,738,437 | 6/1973 | Scheuerman ............... 175/70 |
| 3,989,632 | 11/1976 | Fisher et al. ............... 166/283 X |
| 4,469,611 | 9/1984 | Snyder, Jr. et al. ......... 252/75 |
| 4,631,136 | 12/1986 | Jones, III . |
| 4,921,621 | 5/1990 | Costello et al. ............ 175/65 |
| 5,092,411 | 3/1992 | Hausherr et al. . |
| 5,333,698 | 8/1994 | Van Slyke ................... 175/65 |

FOREIGN PATENT DOCUMENTS

| | | |
|---|---|---|
| 2246802A | 12/1992 | United Kingdom . |
| 88/05080 | 8/1988 | WIPO . |

*Primary Examiner*—Frank S. Tsay
*Attorney, Agent, or Firm*—Pollock, Vande Sande & Priddy

[57] ABSTRACT

A method of using an organic, oil-based pressurized medium derived from natural biological metabolism for the percussion device in a drilling device of a drilling apparatus having a drilling bit at its one end for drilling a hole in the ground comprises: a) causing the organic oil-based pressurized medium derived from natural biological metabolism to flow in the drilling hole through at least the drilling device and possibly one or several drill rods, when joined to the drilling device for increasing the drilling depth of the drilling device, b) driving the percussion device for generating the percussion movement by the organic oil-based pressurized medium derived from natural biological metabolism supplied through a first flow channel provided in the drilling device and the drill rod, c) removing drilling waste generated by the drilling bit at the end of the drilling device by a scavenging agent supplied through a second flow channel provided in connection with the drilling device and the drill rod, and d) supporting the drilling apparatus with a support frame being at least indirectly supported by the ground.

6 Claims, 4 Drawing Sheets

METHOD OF USING A PRESSURIZED MEDIUM IN DRILLING

FIELD OF THE INVENTION

The invention relates to a method of using a pressurized medium for the percussion means in a drilling device of a drilling apparatus for drilling a hole in the ground.

BACKGROUND OF THE INVENTION

Drilling apparatuses using pressurized medium have been know for a long time in the mineral industry, and they comprise: a drilling device, such as a down-the-hole drill or the like, the first end thereof having a drilling means, such as a drill bit, or the like, and the second end of the preferably connectable with one or several drill rods for increasing the drilling depth of the drilling device. The drilling device is at least partially arranged to be driven by a to-and-fro or corresponding percussion movement and comprises at least percussion means for generating the percussion movement driven by a pressurized liquid medium supplied through a first flow channel, Such drilling apparatus further preferably include scavenging means for removing drilling waste generated by the effect of the drilling means, the scavenging means supplying a scavenging agent through a second flow channel preferably in connection with the drilling means of the drilling device, and a support frame being at least indirectly supported by the ground.

Apparatuses of the type described above, using pressurized air, have been widely used in mineral industry for a long time. It is an advantage of a drilling device which is to be placed down the hole that the percussion impact is directed to the drill bit, whereby the energy losses and unnecessary wearing of the components of the apparatus can be reduced in comparison with solutions having the drilling device placed at the rear end of drilling rods. Conventionally in drilling devices driven by pressurized air, pressurized air is used also for scavenging the crushed aggregate. However, it is not advantageous to drive a drilling device by pressurized air, because answer other thing this requires a compressor unit with a very high capacity. Furthermore, the efficiency of a pneumatic system is clearly lower than that of a hydraulic system.

The use of a hydraulic drilling machine is known, for example from the published international application PCT/EP89/00256. In the solution of the above application, the driving unit of the drill rod, driven by a pressurized medium, conveys a to-and-fro rotational motion to the drill rod, as distinguished from the rotational motion conventionally used. Thus, hoses are arranged between the drill rod and the walls of the drill hole, and upon inserting or removing rods, hoses are fed into the hole or reeled in from the hole. To achieve an optimal drilling efficiency and save the hoses, the angle of rotation of the drill rod is preferably limited to the range of 180°–360°. For minimize the wearing of the hoses, an embodiment is presented in the publication where the drill rod comprises two outwardly open longitudinal channels in which the hoses are inserted for feeding in and out the pressurized oil of the drilling machine to be placed in the hole. The hydraulic hoses are o thus preferably inside the circle of the drill rod. Scavenging air is preferably delivered through a hollow drill rod.

The solution described in the above-mentioned publication is not very practical, because massive machinery is required for the handling of hoses. Both hoses must be provided with reeling rolls and driving units, their need of space being determined by the depth of the hole to be drilled. It is difficult to handle the hoses in the drilling situation, and careless installation may result in environmental damage in case of damage to the hoses. Also, hoses of different lengths must be used or they must be fitted with joints when holes of different lengths are drilled, which results in further environmental risks.

SUMMARY OF THE INVENTION

The method of using pressurized medium according to this invention is intended to eliminate the disadvantages described above and thus to improve substantially the state of art in the field. For achieving this aim, the invention is primarily characterized in that the pressurized medium used is an organic, oil-based pressurized medium derived from a natural biological metabolism, such as a vegetable oil, an animal oil, or the like.

Although, the use of vegetable or animal oils in drilling is previously known, the oils of the present type have not been previously used as a hydraulic fluid in any kind of drilling and thus naturally not particularly as the pressurized medium of the percussion means either. For example in the U.S. Pat. No. 4,631,136 and in the GB application 2,246, 802, vegetable and animal oils have been used in drilling as a scavenging agent only.

Further, the use of vegetable oils as a hydraulic fluid has been studied and developed for a long time, articles on this being found from as early as 1983 and 1984. However, for almost ten years, no artisan in the field has been able to apply the use of an organic pressurized medium particularly in down-the-hole drilling of this context, or the like.

The most important advantages of the use of the pressurized medium according to the invention are its simplicity and safety, which are essential requirements for working in both technically advantageous and environmentally safe way. The invention makes it possible to feed the pressurized medium in an integrated way through the drill rods, further facilitating the quick and easy insertion and removal of drill rods whereby it is also possible to use the continuous rotational movement of the drilling device in one direction. Consequently, the use of the pressurized medium according to the invention provides an advantageous technical application, whereby the operation of the drilling device is further optimized in an environmentally safe way.

BRIEF DESCRIPTION OF THE DRAWINGS

In the following description, the invention is disclosed in detail with reference to the appended drawings, in which.

DETAILED DESCRIPTION OF THE PREFERRED EMBODIMENT(S)

Figure 1:
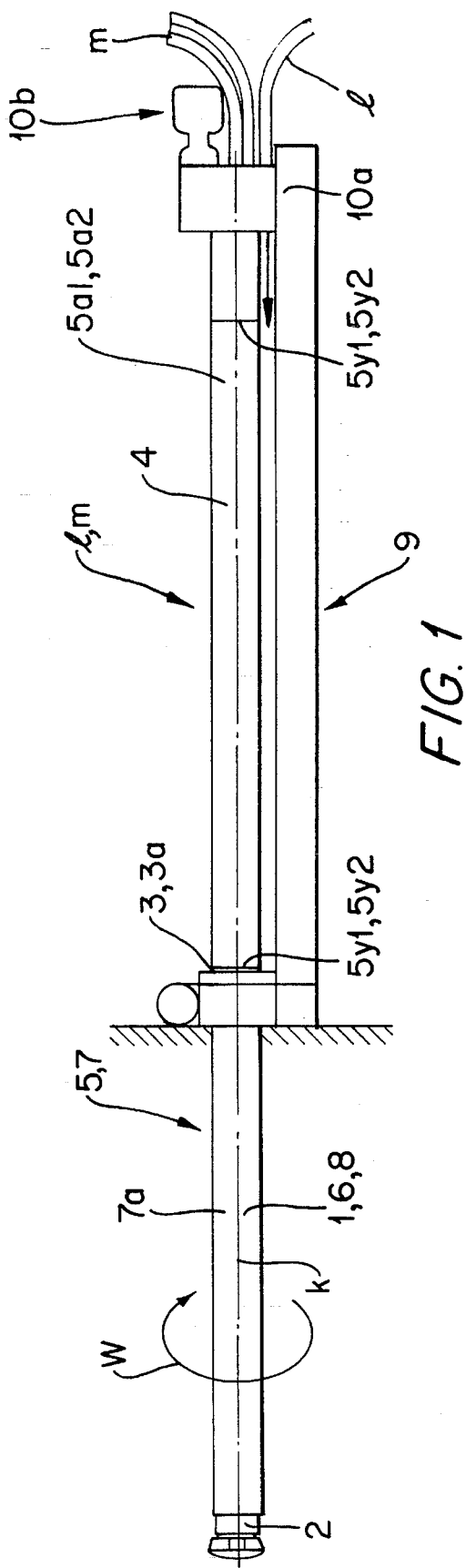
FIG. 1 shows a side view of an advantageous drilling apparatus applying the pressurized medium of the present invention.

FIG. 1 shows an advantageous application of the drilling apparatus using the pressurized medium of the present invention. The drilling apparatus comprises a drilling device 1, such as a down-the-hole drill or the like, the first end thereof having a drilling means, such as a drill bit 2; scavenging means 8 for removing drilling waste generated by the drilling means 2; and a support frame 9 which is at least indirectly supported, on the ground and fitted with feeding means 10a for providing the feeding movement of the drilling device 1 and with motion means 10b for providing the rotational movement or the like of the drilling device 1. The drilling device 1 is driven by a feeding movement in the direction of its longitudinal axis k and by a to-and-fro or corresponding percussion movement as well as by a rotational movement or the like in relation to its longitudinal axis k. The percussion means 6 of the drilling apparatus for providing the percussion movement of the drilling device 1 are hydraulically operated by an organic, oil-based pressurized medium m derived from a natural biological metabolism, such as a vegetable oil, an animal oil, or the like.

The second end of the drilling device 1 is connected by joining means 3 with a separate drill rod 4 for increasing the drilling depth of the drilling device 1 in the direction of the longitudinal axis k. Further, the drilling apparatus comprises a first flow channel 5 for supplying hydraulic fluid m and a second flow channel 7 for supplying scavenging agent 1 to the drill bit 2 functioning as the drilling means of the drilling device 1.

Using a biodegradable pressurized medium according to the present invention, it is possible to supply the pressurized medium to the percussion means through a flowing space integrated in the drill rod. In the use of conventional hydraulic oils, this kind of a solution is not particularly advantageous nor even allowed in all conditions, because possible leaks cause immediate problems, such as contamination of the environment. Thus in the applications shown in FIGS. 1–4, the first flow channel 5 and the second flow channel 7 are arranged substantially in connection with the drilling device 1 and the one illustrated drill rod 4 to provide for the movement of the drilling device 1 in the drilled hole. The drilling device 1 is thus moved preferably by the motion means 10b in a continuous rotational movement w in one direction.

The second flow channel 7 comprises a flowing cavity 7a integrally arranged with the drilling device 1 and the drill rod 4. Thus, the first flow channel 5 comprises in a corresponding manner preferably two flowing cavities 5a1, 5a2 preferably integrally arranged with the drilling device 1 and the drill rod 4.

Figure 2:
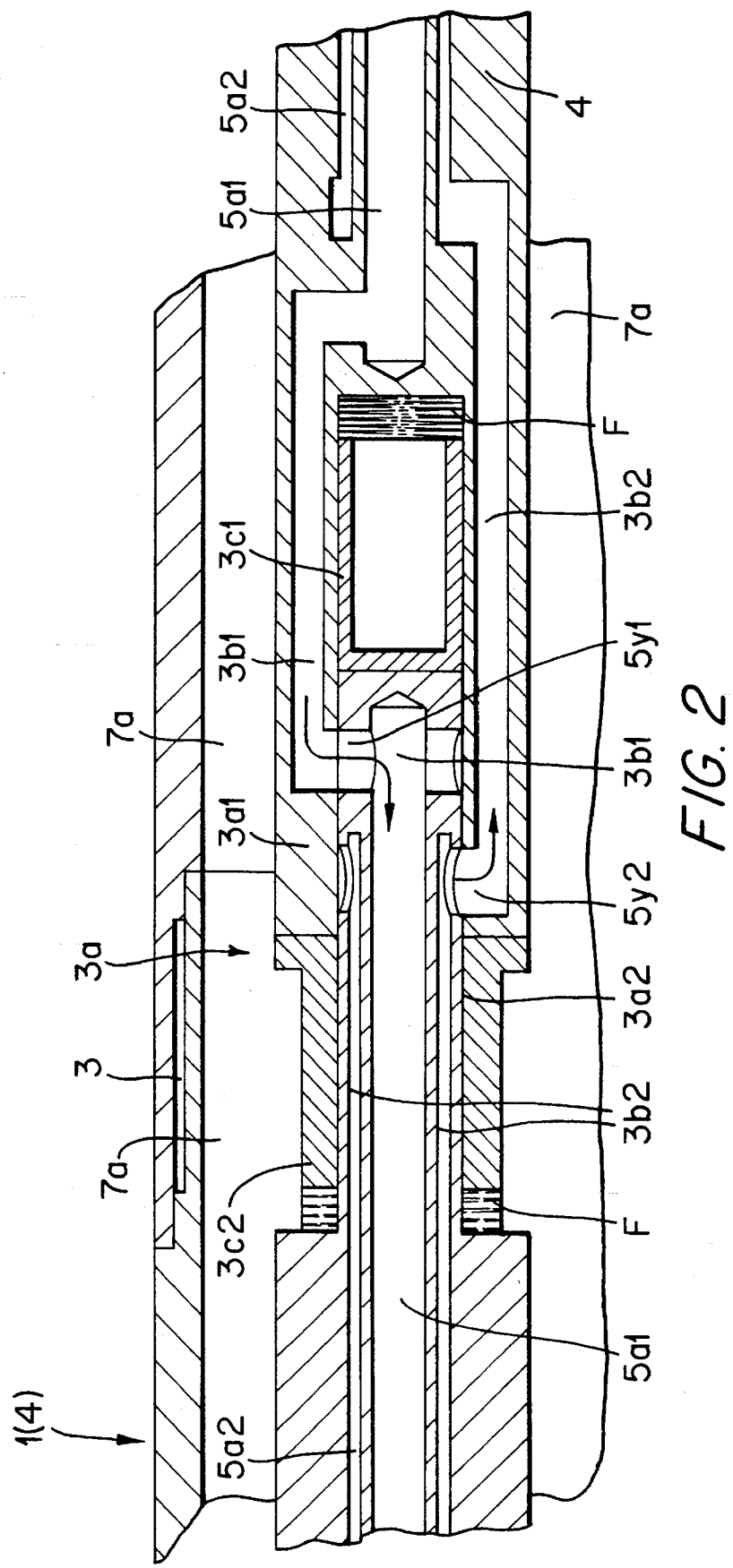
FIG. 2 shows a partial longitudinal cross-section of parts connected with each other by joining means.
Figure 3:
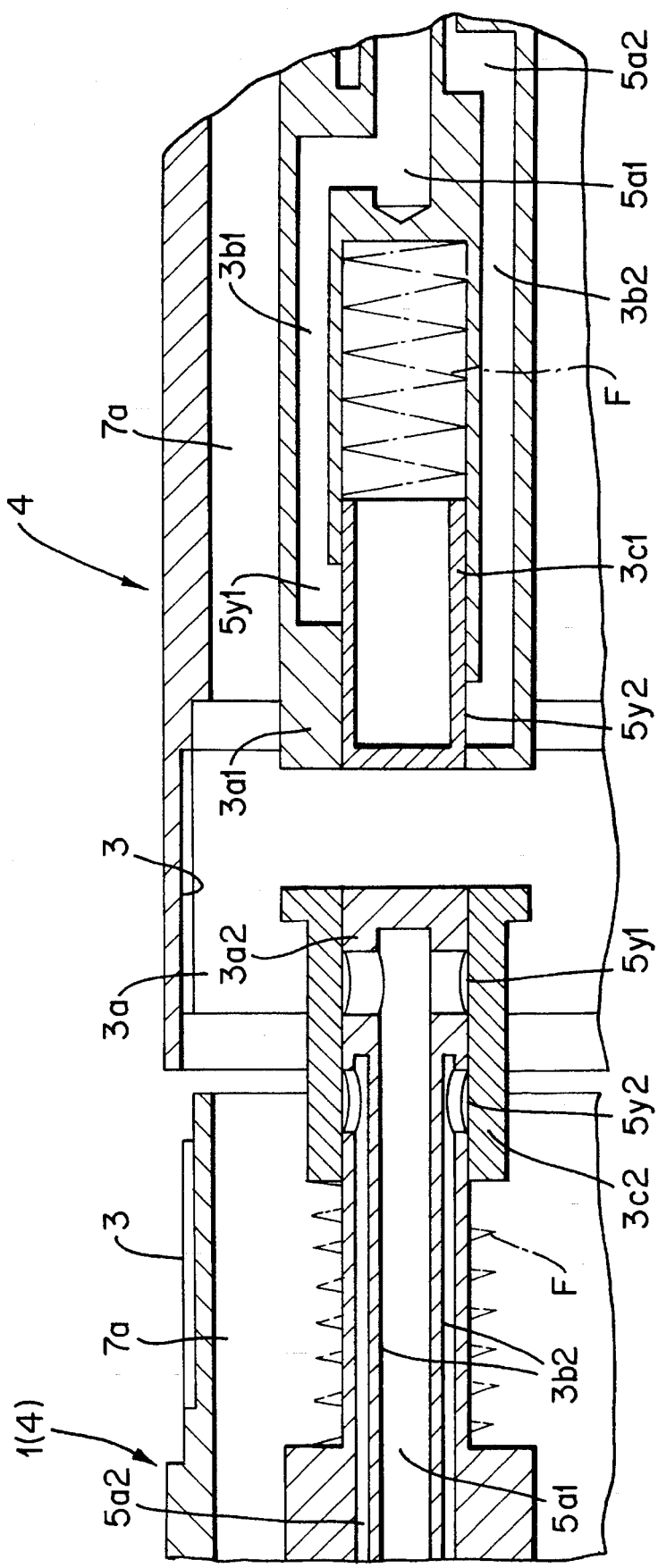
FIG. 3 shows a partial longitudinal cross-section of parts separated from each other.

FIGS. 2 and 3 illustrate the joining means 3 connecting the drilling device 1 and the drill rod 4, as well as the function thereof. The joining means 3 are formed by a threaded coupling, and the first flow channel 5 and the second flow arrangement 7 are arranged as flowing cavities 5a1, 5a2, 7a on top of each other in the drilling device 1 and the drill rod 4 in the radial direction. Further, the joining means 3 comprise coupling means 3a which close the connecting units 5y1, 5y2 that are opened when the parts 1, 4 are disconnected. Upon disconnecting the parts, it is thus possible to keep the hydraulic fluid m inside the parts which, in principle, function as deposits. When the parts are reconnected, the hydraulic fluid is immediately available for use by the drilling device. Before disconnecting the parts, they can be emptied from the hydraulic fluid, for example by pressurized air or in a corresponding manner. Thus upon reconnecting the parts, it is, however, necessary to feed the hydraulic fluid before the actual use of the drilling device.

Figure 4:
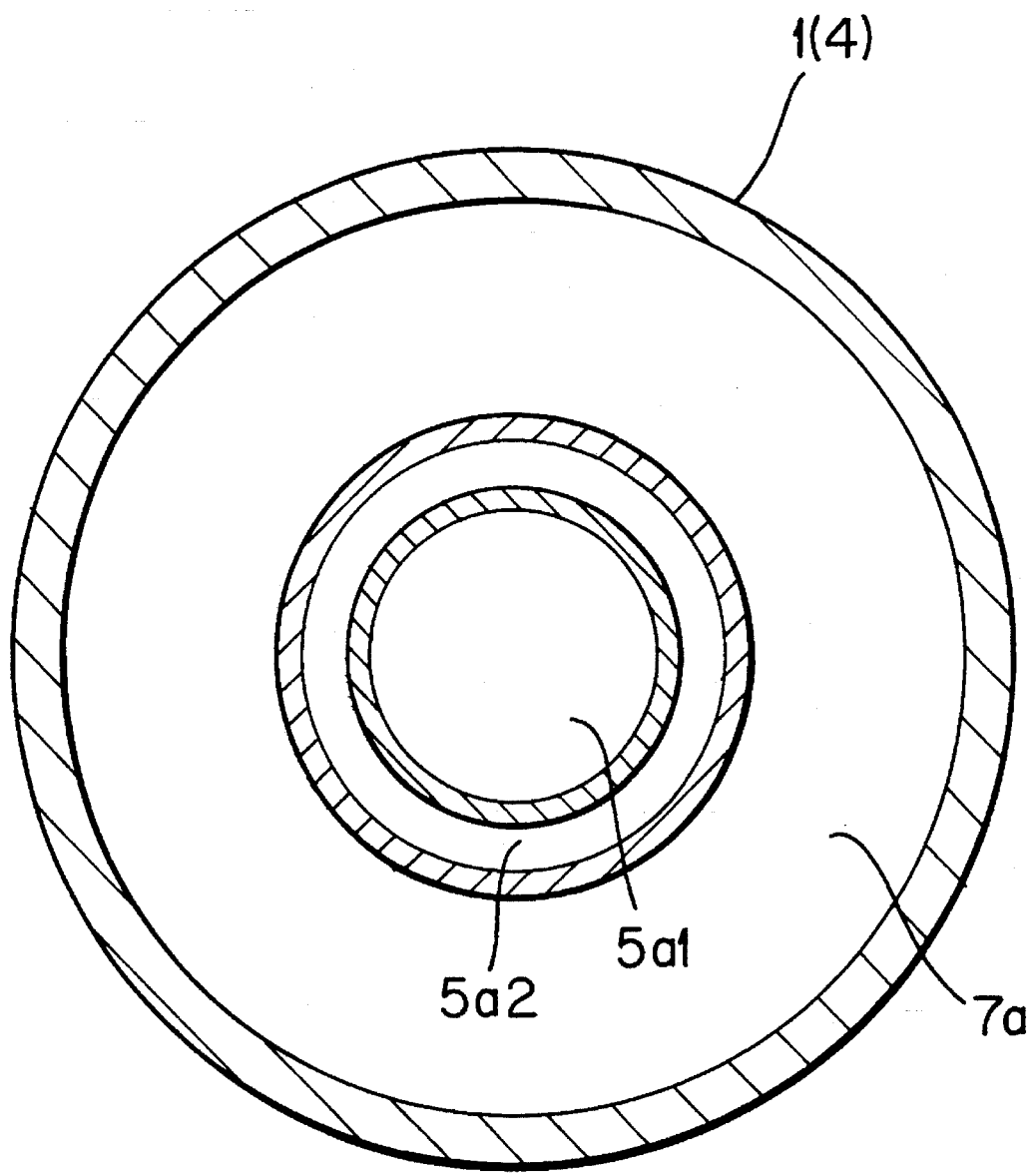
FIG. 4 shows an advantageous cross-section of parts of the drilling apparatus.

As shown in FIG. 4, the flowing cavity 7a for scavenging agent 1 is arranged on the perimeter of the parts 1, 4 to surround the first flow cavity 5a1 arranged centrally for the hydraulic fluid m and the second flow cavity 5a2 surrounding the same.

As shown in FIGS. 2 and 3 in more detail, the coupling means 3a are self-operated by spring suspension f in connection with one end of the drilling device 1 and both ends of the drill rod 4 upon connecting and disconnecting the parts 1, 4, whereby the coupling means 3a are formed by counterparts to be placed within each other (FIG. 2). One of the fitted parts has a recess 3a1 and the other has a projection 3a2. Thus the corresponding flow cavities 5a1, 5a2 of the parts 1, 4 are connected with each other by flow units 3b1, 3a2 in the counterparts 3a1, 3a2. Further, the counterparts 3a1, 3a2 of the coupling means 3a are provided with closing parts, whereby one of the counterparts has a slide part 3c1 and the other has a socket part 3c2 at the end. Thus in the parts separated from each other (FIG. 3), the joint units 5y1, 5y2 of the flow cavities 5a1, 5a2 containing the hydraulic fluid m are closed by the closing parts 3c1, 3c2.

In an advantageous application, the pressurized medium m is an organic medium, such as rape-oil-based, hydraulic fluid or the like.

As a result of continuous development, it has further been found that an advantageous; pressurized medium is a hydraulic fluid based on a vegetable oil ester; an example of this is a synthetic ethyl ester.

It is clear that the present invention is not limited to the applications described above but that it can be varied within the idea even to a great extent. First, the hydraulic fluid of the percussion means can be supplied by hoses or the like. Correspondingly, one of the flow arrangements of the scavenging means can be formed of, for example two channels, one for supplying the scavenging agent and the other for suction through the inner space of the drilling device and the drill rod. In a corresponding manner, the rotational movement of the drilling apparatus can be arranged to and fro, although this requires more complicated and insecure control engineering than the solution presented above.

We claim:

1. A method of using an organic, oil-based pressurized medium derived from natural biological metabolism for the percussion means in a drilling device of a drilling apparatus for drilling a hole in the ground by a down-the-hole drilling, through an action of drilling means provided at an end of the drilling device, whereby the method comprises the steps of:

a) causing the organic oil-based pressurized medium derived from natural biological metabolism to flow in the drilling hole through the drilling device and one or several drill rods which are used when joined to the drilling device for increasing the drilling depth of the drilling device, b) driving the percussion means for generating the percussion movement by the organic oil-based pressurized medium derived from natural biological metabolism supplied through a first flow channel in connection with the drilling device and the drill rod, c) removing drilling waste generated by the drilling means at the end of the drilling device by means of a scavenging agent supplied through a second flow channel in connection with the drilling device and the drill rod, and d) supporting the drilling apparatus with a support frame being at least indirectly supported by the ground.

2. Method of using a pressurized medium according to claim 1, wherein the pressurized medium is vegetable-based hydraulic fluid.

3. Method of using a pressurized medium according to claim 1, wherein the pressurized medium is a hydraulic fluid based on a vegetable oil ester.

4. Method of using a pressurized medium according to claim 2, wherein the pressurized medium is a hydraulic fluid based on a vegetable oil ester.

5. A method of using an organic, oil-based pressurized medium derived from natural biological metabolism for the percussion means in a drilling device of a drilling apparatus including drilling means at one end thereof for drilling a hole in the ground, the method comprising the steps of:

a) causing the organic oil-based pressurized medium derived from natural biological metabolism to flow in the drilling hole through the drilling device;

b) driving the percussion means for generating the percussion movement by the organic oil-based pressurized medium derived from natural biological metabolism which is supplied through a first flow channel provided in the drilling device, c) removing drilling waste generated by the drilling means at the one end of the drilling device by means of a scavenging agent supplied to the drilling means through a second flow channel provided in the drilling device, and d) supporting the drilling apparatus with a support frame being at least indirectly supported by the ground.

6. A method according to claim 5 further comprising: connecting at least one drill rod at the opposite end of the drilling device to extend the drilling depth of the drilling device and extending said first and second flow channels through said at least one drill rod.

* * * * *